H. G. BEEDE.
WHEEL MOUNT FOR SPINNING MACHINES.
APPLICATION FILED JULY 18, 1914.

1,148,741.

Patented Aug. 3, 1915.

Witnesses.
Albert G. Paczenkowski
F. W. Emerson

Inventor.
Herbert G. Beede.
Geo. A. Remington.
Atty.

UNITED STATES PATENT OFFICE.

HERBERT G. BEEDE, OF PAWTUCKET, RHODE ISLAND.

WHEEL-MOUNT FOR SPINNING-MACHINES.

1,148,741. Specification of Letters Patent. Patented Aug. 3, 1915.

Application filed July 18, 1914. Serial No. 851,687.

*To all whom it may concern:*

Be it known that I, HERBERT G. BEEDE, a citizen of the United States, residing at Pawtucket, in the county of Providence and State of Rhode Island, have invented certain new and useful Improvements in Wheel-Mounts for Spinning-Machines, of which the following is a specification.

Textile machines of the class referred to are usually provided with a plurality of spindles disposed in series, the spindles of each group being rotated by a suitably driven endless belt or band passing around a freely revoluble idle or tension-pulley removably mounted in a support or yoke; the function of the tension-pulley is to automatically take up slackness in the belt, thereby preventing any material variations in the tension or pull of the belt, the result being to cause the spindles of the group to rotate at a practically uniform speed and producing threads or yarn having a correspondingly uniform twist.

The essential object I have in view is to provide the pulley-carrying yoke or support with bearings and a locking device arranged to securely hold in position the tension-pulley and its members against movement in longitudinal and lateral directions, while at the same time permitting the pulley and its axle to revolve freely in the bearings.

The device forming the subject of my invention is extremely simple and inexpensive in construction; it is readily accessible and easily actuated; it forms, in connection with the yoke or support and bearings, positive locking means for retaining the pulley, etc., in the normal operative position or relation, in that longitudinal or endwise and lateral movements are prevented, as before stated. The pulley, together with its axle and bearings, may be quickly withdrawn or removed bodily from the supporting yoke by simply retracting the locking or confining bolt permanently connected to the support.

Figure 1:
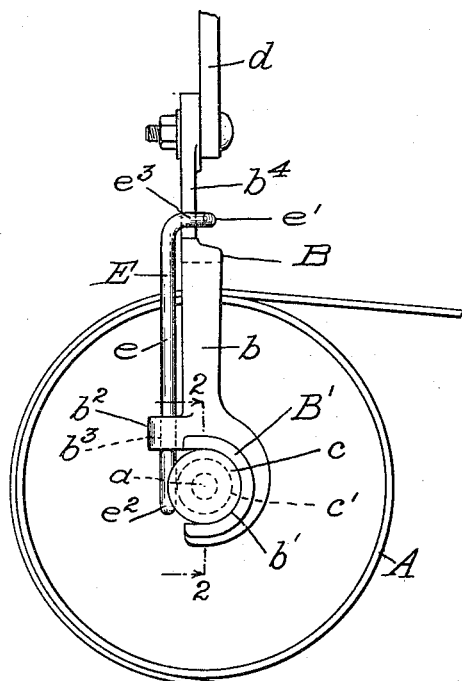
Figure 2:
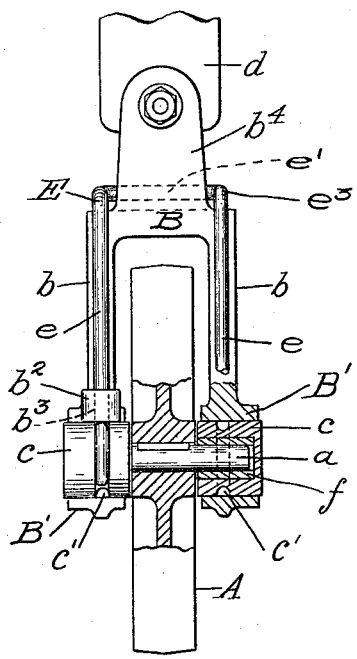
Figures 3, 5:
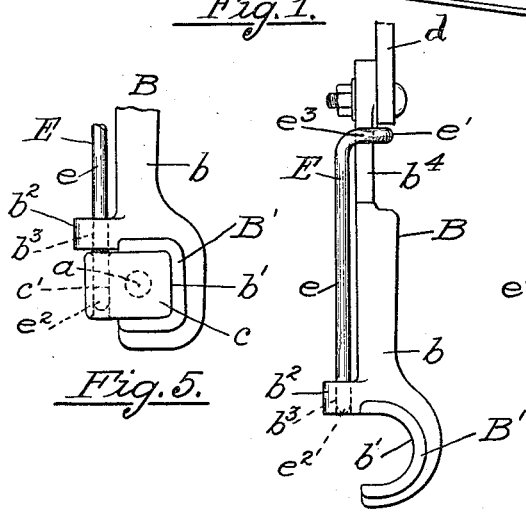
Figure 4:
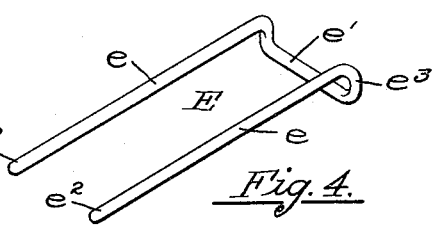

In the accompanying drawings Figure 1 represents, in side elevation, a yoke having a tension-pulley removably mounted therein and provided with my improved locking device normally positioned to prevent the axle bearings from movement in any direction; Fig. 2 is a front view, portions being shown in central section, taken on line 2 2 of Fig. 1; Fig. 3 is a side elevation of the yoke and locking device, the latter being in the unlocked position, with the bearings, axle and tension-pulley omitted; Fig. 4 is a perspective view of the securing-bolt detached from the yoke; and Fig. 5 is a side view of the lower portion of the yoke showing a modified form of the axle-bearing removably seated and normally confined therein.

A, in the drawings, indicates a take-up or tension-pulley of the type or class referred to, fixed to a center axle $a$ freely revoluble in the bearings $c$.

B represents a yoke normally sustaining the said pulley, etc. The yoke member is provided with a pair of laterally spaced apart parallel downwardly extending arms $b$; the free ends of the arms terminate each in a holder portion $B^1$ having a recessed seat $b^1$ adapted to receive the respective bearings $c$; the shape of the said seat may conform to the corresponding portion of the bearing. The upper or head part of the yoke has a central extension or neck $b^4$ arranged to connect with and be suspended from a suitable hanger member $d$. The said yoke arms $b$ are provided in front with a lug $b^2$ having a vertical perforation $b^3$ adapted to receive, guide and support the free end portions of the securing-bolt E, soon to be described. The said bearings $c$ are removably fitted in the said seats of the holder portion $B^1$ of the yoke; each bearing being provided with a transverse aperture or score $c^1$ disposed at substantially right angles to the axis of rotation of the axle $a$, and being in alinement with the said perforations $b^3$ of the respective lugs.

If desired, the bearing members $c$ may be provided with non-revoluble anti-friction or self-lubricating bushings $f$ bored to receive the ends of the revoluble axle, substantially as indicated in Fig. 2. The said score may extend wholly or partly around the perimeter of the bearing. If desired, the latter may be polygonal, substantially as shown in Fig. 5, in which case the aperture is formed in the front face of the bearing member and in vertical alinement with the perforation $b^3$ of the lug $b^2$, substantially as before stated.

The forked bolt or locking member E is integrally formed from a length of comparatively stiff material, as steel, the same being bent to produce a central head or tie member $e^1$, which serves also as a handle. The ends of the tie proper are bent parallel in a horizontal plane (see $e^3$ Figs. 1 and 2) to receive the said relatively stationary neck $b^4$ of the yoke; the material being further bent at right angles to produce a pair of downwardly extending, laterally separated, parallel bolt-arms $e\ e$ having the lower portion $e^2$ slidably mounted in the perforations $b^3$ of the respective lugs and also arranged to freely enter the aperture or score of the corresponding bearings.

It will be observed that by means of my improvement the pulley-carrying axle $a$ revolubly mounted in the bearings $c$, in turn removably supported in the respective recessed seats of the yoke or frame B, is adapted to positively and accurately position the said parts in the yoke, while at the same time the engagement of the bolt with the adjacent sides of the apertured or scored portion of the bearings prevents the latter from movement in any direction in said seats. The bolt is fitted to slide without play in the co-engaging members. The bolt may be readily moved upward to its stop or limit, substantially as indicated in Fig. 3, thereby unlocking or releasing the bearings and permitting them to be readily withdrawn from the yoke or replaced therein, as desired.

I claim as my invention:—

1. In a supporting and locking device for tension-pulleys of textile spinning, twisting and winding or spooling machines, the combination of a yoke or frame provided with a pair of spaced apart depending forked arms, each arm having an open recess or seat formed in the face of its lower or free end portion, a bearing removably seated in each of said recesses, said bearings adapted to receive a revoluble central axle and being further provided with an aperture or score, and a forked or bifurcated endwise movable locking bolt, the arms of said bolt being supported and guided in the respective arms of said yoke and also arranged to normally engage and interlock with the said apertured or scored portion of the bearings.

2. In mechanism of the general character described, a forked yoke or frame provided with a pair of alining open recesses constituting seats, relatively stationary bearings removably seated in the recesses, each of said bearings having an aperture or score formed in its periphery, an axle freely revoluble in the bearings and a friction-pulley secured to the axle, the combination therewith of a forked locking bolt slidably supported and guided in the yoke member, the arms of said bolt arranged to register and interlock with said apertured portion of the respective bearings.

3. The combination in a textile spinning-machine, with a forked frame or yoke provided with a pair of horizontally alining recesses, of a tension pulley, bearing members removably seated in said recesses of the yoke, said bearing members having said tension-pulley revolubly journaled therein, each bearing member having a groove or opening arranged at substantially right angles with its axial bore, and a bifurcated bolt having parallel arms slidably mounted in the yoke, the said arms of the bolt being in register with and normally engaging said grooves or openings and arranged to lock both the said bearing members in position in the yoke simultaneously.

In testimony whereof I have affixed my signature in presence of two witnesses.

HERBERT G. BEEDE.

Witnesses:
HARRIE L. FALES,
GEO. H. RICHARDSON.

Copies of this patent may be obtained for five cents each, by addressing the "Commissioner of Patents, Washington, D. C."